(12) United States Patent  (10) Patent No.: US 8,583,404 B2
Nakamura et al.  (45) Date of Patent: Nov. 12, 2013

(54) PHOTOELECTRIC SENSOR AND METHOD FOR AIDING CHECKING OF THRESHOLD

(75) Inventors: Hideyoshi Nakamura, Ayabe (JP); Atsushi Iwamoto, Ayabe (JP); Koji Kosaka, Ayabe (JP); Susumu Mizuhara, Kameoka (JP)

(73) Assignee: OMRON Corporation, Kyoto (JP)

( * ) Notice: Subject to any disclaimer, the term of this patent is extended or adjusted under 35 U.S.C. 154(b) by 467 days.

(21) Appl. No.: 13/023,219

(22) Filed: Feb. 8, 2011

(65) Prior Publication Data

US 2011/0218766 A1  Sep. 8, 2011

(30) Foreign Application Priority Data

Mar. 5, 2010 (JP) ................. 2010-049721

(51) Int. Cl.
  *G04F 1/00*  (2006.01)
(52) U.S. Cl.
  CPC ..................... *G04F 1/00* (2013.01)
  USPC ........................................................ 702/176
(58) Field of Classification Search
  CPC .................................................... G04F 1/00
  USPC ............................. 702/176, 182–185
  See application file for complete search history.

(56) References Cited

U.S. PATENT DOCUMENTS 6,944,359 B2  9/2005 Kamei et al.
2003/0010891 A1*  1/2003 Mizuhara et al. ............. 250/205

FOREIGN PATENT DOCUMENTS

JP  2004-205363 A  7/2004
JP  2007-093464 A  4/2007
JP  2009-033764 A  2/2009

OTHER PUBLICATIONS

Korean Office Action issued in Korean patent application No. 9-5-2012-056800738, dated Nov. 25, 2012 with full Japanese translation and partial English translation (6 pages).
Patent Abstracts of Japan, Publication No. 2007-093464, Publication Date: Apr. 12, 2007, 1 page.

* cited by examiner

*Primary Examiner* — Edward Raymond
(74) *Attorney, Agent, or Firm* — Osha Liang LLP

(57) ABSTRACT

A photoelectric sensor comprises a control unit which performs a measuring process for data on an amount of light input from a light-receiving unit. The control unit measures the length $T_{PS}$ of period (from point a to point d) from when measurement data starts to change in the direction of a threshold P0 to when the amount of received light returns to the level at which the measurement data started to change, and the length $T_{ON}$ of period (from point b to point c) for which the detection signal is ON-level. The control unit then outputs information on a margin for $T_{PS}$ with respect to $T_{ON}$ on a display unit provided for the photoelectric sensor or to an external device in order to display them.

6 Claims, 7 Drawing Sheets

OK display

NG display

Select standard mode

Select high speed mode

Prior Art

PHOTOELECTRIC SENSOR AND METHOD FOR AIDING CHECKING OF THRESHOLD

BACKGROUND

1. Technical Field

The present invention relates to a photoelectric sensor used for, for example, detecting the passage of a moving object through a target location or detecting a change in the orientation of an object. The present invention also relates to a method for aiding the checking of whether a threshold set for a photoelectric sensor used for such detection is appropriate.

2. Description of the Related Art

Examples of photoelectric sensors include a type (transmission type) that receives light emitted from a light-projecting unit and passed through an area for detecting an object to be detected (hereinafter referred to as a detection target), and a type (reflection type) that receives light emitted from a light-projecting unit and then reflected by a detection target. The sensors of both types convert a signal indicating an amount of received light, output from a light-receiving unit, into digital data and input the converted data (hereinafter referred to as "data on an amount of received light") into a processing circuit that incorporates a microprocessor. Then, these sensors compare the value of the data on the amount of received light with a preset threshold to determine the presence or absence of a detection target. They subsequently output a detection signal indicating an ON-state if the presence of the detection target is detected. Depending on the purpose of each sensor, the sensor may calculate the change or the moving average of amounts of received light and compare the value obtained from this measurement with a threshold, thereby determining the presence or absence of an object.

In order to reliably detect a detection target by use of such a photoelectric sensor, it is necessary to set a threshold that has sufficient margin both for the level of measurement data before the data are changed by the detection target (hereinafter referred to as "off level") and for significantly changed area of measurement data (hereinafter referred to as "peak level"). This is because if a value close to the off level is set as a threshold, the measurement data is susceptible to noise. Generally, as the threshold approaches the peak level, the time period during which the measurement data exceed the threshold shortens. Correspondingly, the number of measurement data exceeding the threshold decreases, whereby detection reliability deteriorates.

In order to set an appropriate threshold that takes the foregoing drawbacks into account, it is desirable to specify an appropriate value for the threshold after checking how measurement data change in accordance with movements of a detection target. However, if detection targets move at high speed, signals indicating the amount of received light and measurement data obtained from such signals change very fast, and it is very difficult to check such changes.

In order to overcome the foregoing problem, some of conventional photoelectric sensors measure the length of time period during which a detection signal is off (hereinafter referred to as "OFF-period") and the length of time period during which a detection signal is on (hereinafter referred to as "ON-period"), and then display the lengths of these periods side by side, thereby enabling a user to know the degree of operational reliability of the sensor (refer to, for example, Japanese Patent Application Laid-Open No. 2007-93464).

SUMMARY

In accordance with one aspect of the present invention, a photoelectric sensor includes: a light-projecting unit for projecting light; a light-receiving unit for receiving light projected from the light-projecting unit and generating data on an amount of received light; an output unit for outputting a detection signal indicating that a detection target has been detected; a signal processing unit for receiving the data on the amount of received light generated by the light-receiving unit, performing a measuring process for the data on the amount of received light, comparing measurement data obtained by the measurement process with a predetermined threshold to determine whether a detection target is present or not, and switching between ON and OFF states of the detection signal according to a result of the determination; and an input unit for inputting a set value for the threshold.

In the foregoing configuration, the light-receiving unit may directly receive light emitted by a light-projecting element (transmission type) or may receive light that is emitted by a light-projecting element and then reflected by an object (reflection type). The signal processing unit performs the measuring process, for example, by measuring every time or every fixed time a datum on an amount of received light, input by the light-receiving unit. Further, the signal processing unit may calculate: the change in an amount of received light per unit time by differentiating data on an amount of received light obtained by the measurement, or the moving average on the data of the amount of received light.

In the photoelectric sensor, the signal processing unit includes: first time-measuring means for measuring a length of a measurement data change period which is from when measurement data at a level at which the detection signal is off starts to change in a direction of the threshold to when the measurement data returns to a level at which the measurement data started to change; second time-measuring means for measuring a length of an ON-period for which measurement data at a level at which the detection signal is on is obtained during the measurement data change period; and output means for outputting, on the basis of measurement results obtained from the first time-measuring means and the second time-measuring means, information on the length of the ON-period and on a margin for the measurement data change period with respect to the ON-period in order to display the information.

If the photoelectric sensor is provided with a display unit, the output unit can supply information on the margin to the display unit. In addition, if the photoelectric sensor is set so as to communicate with an external device with a display function, the output means may be configured as means for transmitting information on the margin to this external device.

The "margin for the measurement data change period with respect to the ON-period" described above shall mean how long the ON-period can be extended in the measurement data change period. Information indicating the margin may be the length of the measurement data change period as is. However, the ratio of the two periods or the difference between the lengths of the periods may be displayed. In addition, the value of the ratio or difference may be converted into one level out of a plurality of levels and the level may be displayed.

In the photoelectric sensor according to an embodiment of the present invention, the signal processing unit further includes determination means for determining whether the margin is appropriate on the basis of a relationship between the length of the measurement data change period and the length of the ON-period. In addition, the output means outputs a determination result obtained by the determination means, together with the information on the margin.

In the photoelectric sensor according to another embodiment of the present invention, the signal processing unit further includes: determination means for determining whether the margin is appropriate on the basis of the relationship between the length of the measurement data change period and the length of the ON-period; and threshold adjustment means for adjusting, if the determination means determines that the margin is inappropriate, the threshold so that the relationship between the length of the measurement data change period and the length of the ON-period satisfies a predetermined reference relationship.

In the photoelectric sensor according to another embodiment of the present invention, a plurality of measurement modes of different processing speeds are set for the signal processing unit, and the signal processing unit further includes mode selection means for selecting a measurement mode for carrying out measurement at least a predetermined number of times during the ON-period, from among the plurality of measurement modes, provided that the determination means has determined that the threshold is appropriate.

In the photoelectric sensor according to another embodiment of the present invention, the signal processing unit further includes: third time-measuring means for measuring a length of time period from when the measurement data change period starts to when the measurement data reaches the threshold within the measurement data change period; and measured-time output means for outputting data on the length of time period measured by the third time-measuring means. The measured-time output means may be configured as means for outputting data to be displayed. However, the present invention is not limited this mode. For example, data on the length of measured time period may be transmitted to an external device as calculation data.

Further, an embodiment of the present invention is applied to a method for aiding checking whether or not a threshold set for a photoelectric sensor is appropriate. The photoelectric sensor includes: a light-projecting unit for projecting light; a light-receiving unit for receiving light projected from the light-projecting unit and generating data on an amount of received light; an output unit for outputting a detection signal indicating that a detection target has been detected; a signal processing unit for receiving the data on the amount of received light generated by the light-receiving portion, performing a measuring process for the data on the amount of received light, comparing measurement data obtained by the measurement process with a predetermined threshold to determine whether a detection target is present or not, and switching between ON and OFF states of the detection signal according to a result of the determination; and an input unit for inputting a set value for the threshold.

The method includes: causing the photoelectric sensor to measure a length of a measurement data change period which is from when measurement data at a level at which the detection signal is off starts to change in a direction of the threshold to when the measurement data returns to a level at which the measurement data started to change; and causing the photoelectric sensor to measure a length of an ON-period for which measurement data at a level at which the detection signal is on is obtained during the measurement data change period. In addition, on the basis of a relationship between the lengths of the measurement data change period and the ON-period, information on the length of the ON-period and on a margin for the measurement data change period with respect to the ON-period is displayed on a display unit provided integrally with the photoelectric sensor or on an external display provided for the photoelectric sensor.

DETAILED DESCRIPTION

The invention disclosed in Japanese Patent Application Laid-Open No. 2007-93464 explains that the degree of operational reliability of the photoelectric sensor is determined from the relationship between the displayed ON-period and the OFF-period. However, the determination is not always easy. A detailed example of such a situation will now be given with reference to FIG. 10.

Figure 10A:
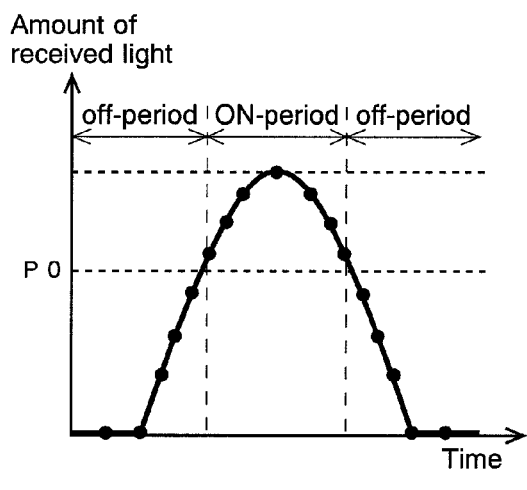
FIG. 10 shows the relationship between a set value for a threshold, an ON/OFF period, and the number of measurement values.
Figure 10B:
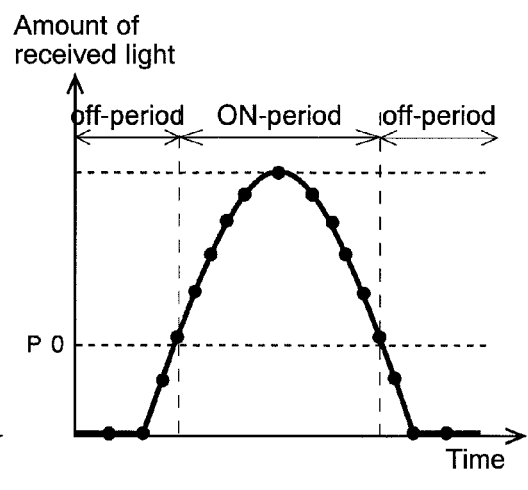

Each of FIGS. 10A and 10B shows the relationship between the ON-period and the OFF-period, and the threshold, using a curve representing changes in signal indicating an amount of light received by a photoelectric sensor that is a type of detecting an object from increases in an amount of received light. In the signal indicating an amount of received light, the amounts of received light as measurement targets are indicated by dots on this curve.

In each drawing, P0 represents a threshold, and the time period during which the amount of received light is greater than P0 is defined as an ON-period whereas the time period during which the amount of received light is smaller than P0 is defined as an OFF-period.

In order to reliably detect a moving detection target by use of this photoelectric sensor, it is necessary for the threshold P0 to be set so that an amount of received light which exceeds the threshold is measured a certain number of times in succession. As shown by the difference between the number of dots during the ON-period in FIG. 10A and that in FIG. 10B, if the threshold P0 can be decreased while the margin for the base level is maintained, the number of times that a datum on an amount of received light which exceeds the threshold P0 can be measured increases, thereby enhancing detection reliability. However, the state of the amount of received light at each point during an OFF-period is actually unclear. This makes it difficult for a user to determine the degree to which he or she can decrease the threshold.

This problem similarly arises in a photoelectric sensor configured to detect an object from decreases in the amount of received light.

For this a reason, a user may set a threshold by trial and error, increasing the burden on the user in setting thresholds.

The following embodiments address the above-mentioned problems, and aim to enable a user to easily check whether a threshold that is appropriate for reliable detection has been set.

Figure 1:
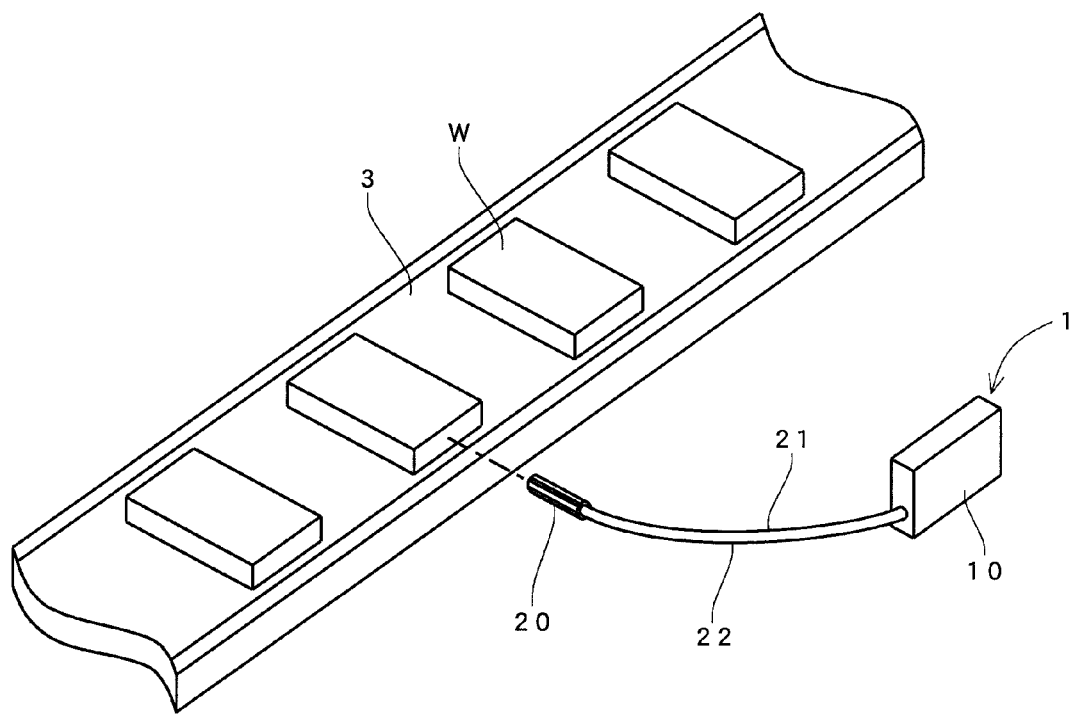
FIG. 1 shows an example of the use of a photoelectric sensor to which the present invention is applied.

FIG. 1 shows an example of the use of a photoelectric sensor to which the present invention is applied.

The photoelectric sensor 1 according to the present example is a reflection type sensor in an optical fiber system. The sensor is installed near a factory production line 3 in order to detect works W (for example, electronic components) being conveyed on the line 3.

Figure 4:
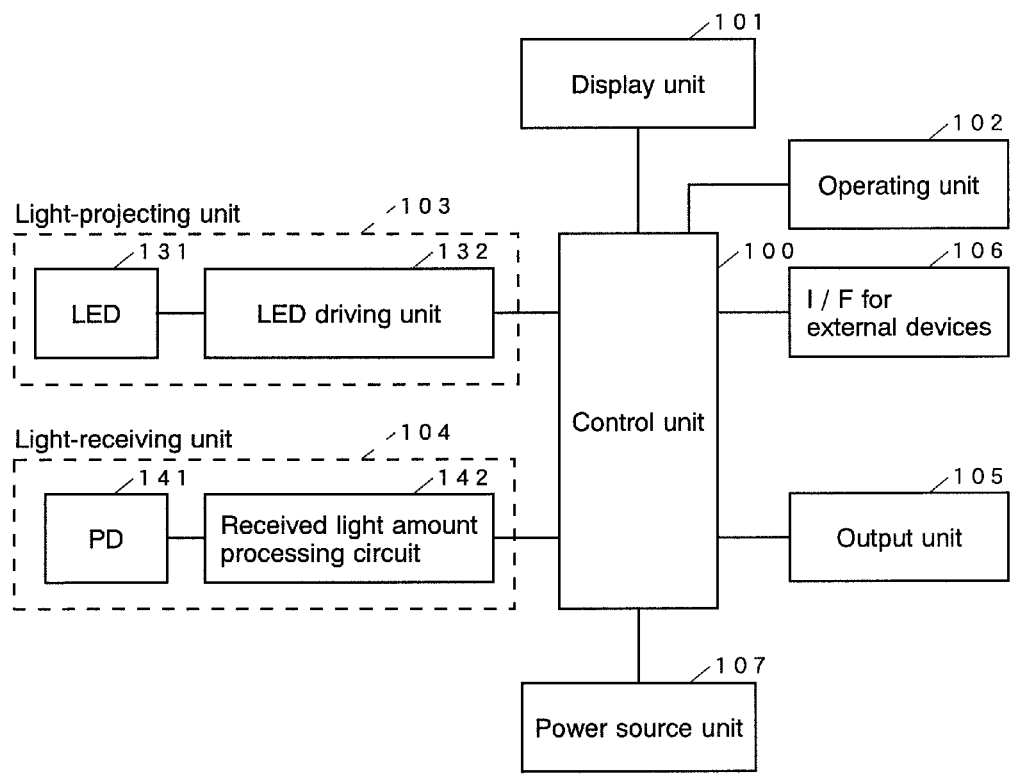
FIG. 4 is a block diagram showing the circuit configuration of the photoelectric sensor.

In order to detect a work W, a light-projecting optical fiber 21 and a light-receiving optical fiber 22 are drawn out from the main body of the photoelectric sensor 1. The leading ends of the optical fibers 21 and 22 are connected to a common head portion 20. Disposed near openings in the main body of the photoelectric sensor 1, in which the fibers 21 and 22 are inserted, are an LED 131 and a photodiode (PD) 141, which are shown in FIG. 4. Light emitted from the LED 131 is further emitted from the head portion 20 via the light-projecting fiber 21. In addition, when light reflected from a work W, which corresponds to this emitted light, is made incident on the head portion 20, the incident light is guided to the photodiode 141 via the light-receiving fiber 22. Consequently, the amount of light received by the photodiode 141 increases.

A processing circuit in the photoelectric sensor 1 detects the increase in the amount of received light and outputs a signal indicating the result of the detection (i.e., a detection signal) to a device for performing a process with the work W (for example, a visual sensor 1 for inspecting a work).

Figure 2:
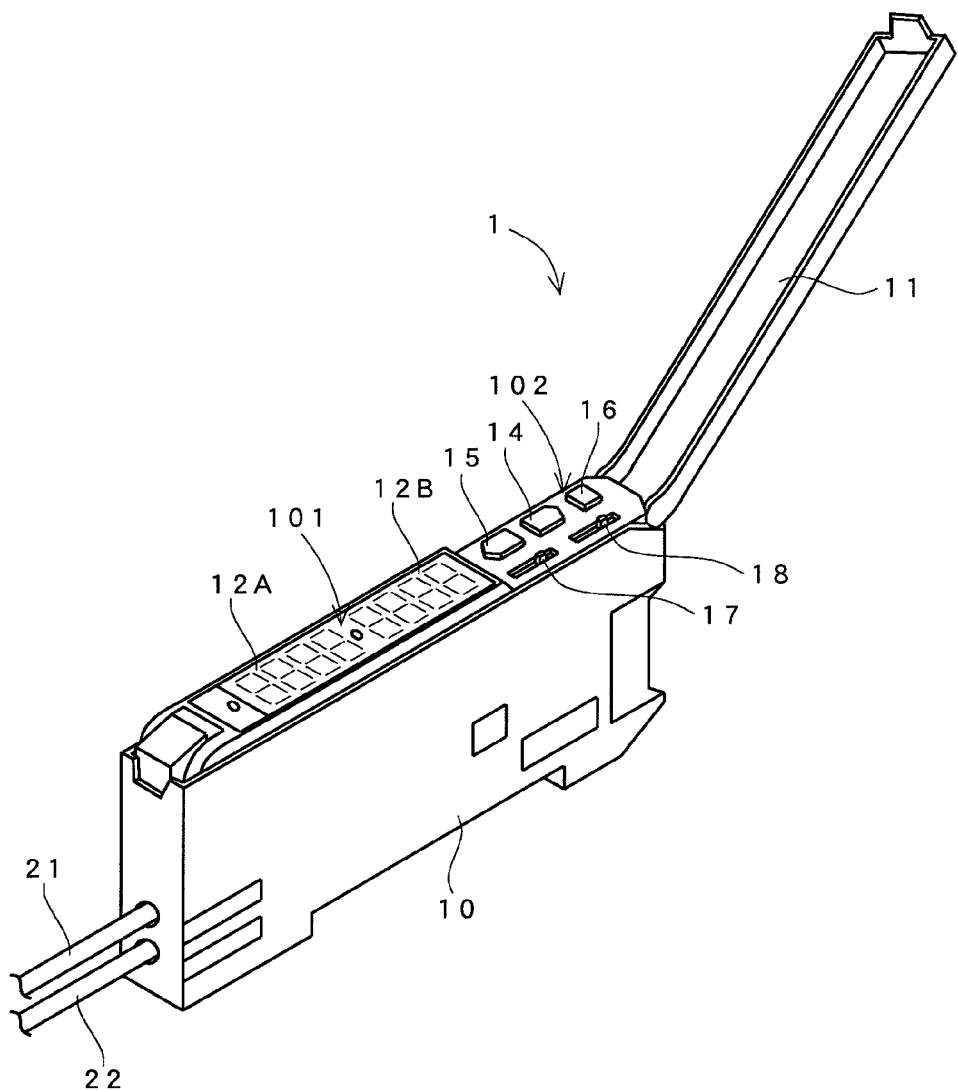
FIG. 2 is a perspective view showing the appearance of the photoelectric sensor.

FIG. 2 shows the appearance of the main body of the foregoing photoelectric sensor 1. The main body of the photoelectric sensor 1 includes a case body 10 with a lid portion 11 at the top thereof. While the optical fibers 21 and 22 are drawn out from the front of the case body 10, a cord line (not shown) is drawn out from the rear thereof. The top of the case body 10 has a display unit 101 and an operating unit 102, which are, however, covered with the lid portion 11 when the sensor 1 is in operation.

Figure 3:
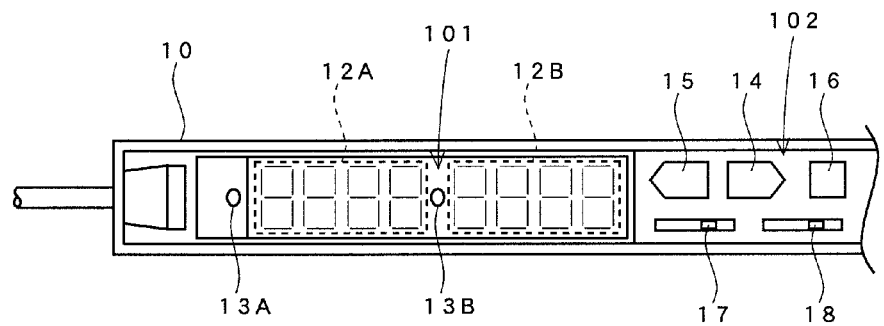
FIG. 3 is a plan view showing the top of the case body of the photoelectric sensor.

FIG. 3 is a plan view showing the configuration of the display unit 101 and the operating unit 102. The display unit 101 has two digital displays, 12A and 12B, each of which displays a four-digit number. On the left side of the digital displays 12A and 12B are operating lamps 13A and 13B, respectively. In addition to numbers, each of the digital displays 12A and 12B may display a character string incorporating the alphabet.

The operating unit 102 includes three push button switches, 14, 15, and 16, and two slide switches, 17 and 18.

Of these push button switches 14 to 16, the middle one 14 and the left one 15 are in the shape of an arrow indicating a rightward direction and the shape of an arrow indicating a leftward direction, respectively, and are used to switch the display contents of the displays 12A and 12B to a setting mode or to change a set value.

The push button switch 16 on the right side is used for settling the value displayed on the displays 12A and 12B or to select a function recalled by the switches 14 and 15.

The slide switch 17 selects either a setting mode or a measuring mode as an operating mode for the photoelectric sensor 1. Based on output from the photoelectric sensor 1, the other slide switch 18 selects a mode (a light-on mode) for turning on output when the data on the amount of received light exceeds the threshold and a mode (a dark-on mode) for turning on output when the data on the amount of received light decreases below the threshold.

FIG. 4 shows the configuration of the circuit in the photoelectric sensor 1 described above.

The display unit 101 shown in FIG. 4 includes the digital displays 12A and 12B and the operating lamps 13A and 13B shown in FIG. 3. The operating unit 102 includes the switches 14 to 18, which are also shown in FIG. 3. The case body 10 accommodates a control unit 100, a light-projecting unit 103, a light-receiving unit 104, an output unit 105, an interface 106 for external device or devices, and a power source unit 107.

The light-projecting unit 103 includes the LED 131 and a driving circuit (LED driving circuit) 132 for the same. In addition to the photodiode (PD) 141, the light-receiving unit 104 includes a circuit for processing a signal indicating the amount of received light after output from the photodiode (hereinafter referred to as the received light amount processing circuit 142). The received light amount processing circuit 142 includes an amplifying circuit, an A/D conversion circuit, and the like. These circuits convert a signal indicating an amount of received light into a value that is in the range of 0 to 4000, and then output the converted signal.

The control unit 100 includes a microprocessor, which incorporates a CPU and a nonvolatile memory. Not only are programs stored in the memory, but also parameters (such as a threshold) set by a user are registered in this memory. While controlling the light-emitting operation of the light-projecting unit 103 on the basis of the programs and parameters, the CPU receives digital data (hereinafter referred to as "data on the amount of received light") generated as a result of the conversion process performed by the received light amount processing circuit 142. The CPU then measures amounts of received light, indicated by these input data, at fixed intervals, and compares each measurement (i.e., measurement value) with a threshold, thereby determining whether a detection target is present or not.

The output unit 105 is configured such that a signal indicating the result of the determination described above (the detection signal) is output to the outside. The interface 106 for any external devices is used for exchanging information with a not-shown setting device.

The power source unit 107 is connected to an external power source (not shown), and supplies each unit with drive power by using power supplied from the external power source.

To operate the photoelectric sensor 1 with the foregoing configuration, a user first operates the photoelectric sensor 1 while moving a work W as a trial model, with the slide switch 17 set in the setting mode. At this time, the control unit 100 of the photoelectric sensor 1 performs a sampling process in which data on an amount of received light, supplied by the received light amount processing circuit 142, are measured at fixed intervals. In addition, the control unit 100 compares each measurement value with the default threshold, thereby determining whether a detection target is present. Based on the determination result, the control unit 100 sets a detection signal to an on- or off-state. Additionally, the control unit 100 measures: a time period during which an amount of received light changes according to the movement of the work W, and a time period (ON-period) during which an amount of received light exceeds the threshold during the former time period. The control unit 100 subsequently displays these time periods on the display unit 101 as an index to be used for determining whether the value set for the threshold is appropriate.

When a user determines from this display that the threshold is inappropriate, the user can adjust the threshold by use of the operation switches 14 to 16, in which case also, the two time periods described above are measured and the result updates the display on the display unit 101. Each time the threshold is subsequently adjusted, each of the time periods is measured and the display on the display unit 101 is updated.

When a user determines from this display that the threshold is set to an appropriate value, the user sets the slide switch 17 to the measurement mode. Thereafter, the control unit 100 starts a detection operation based on the set threshold.

Figure 5:
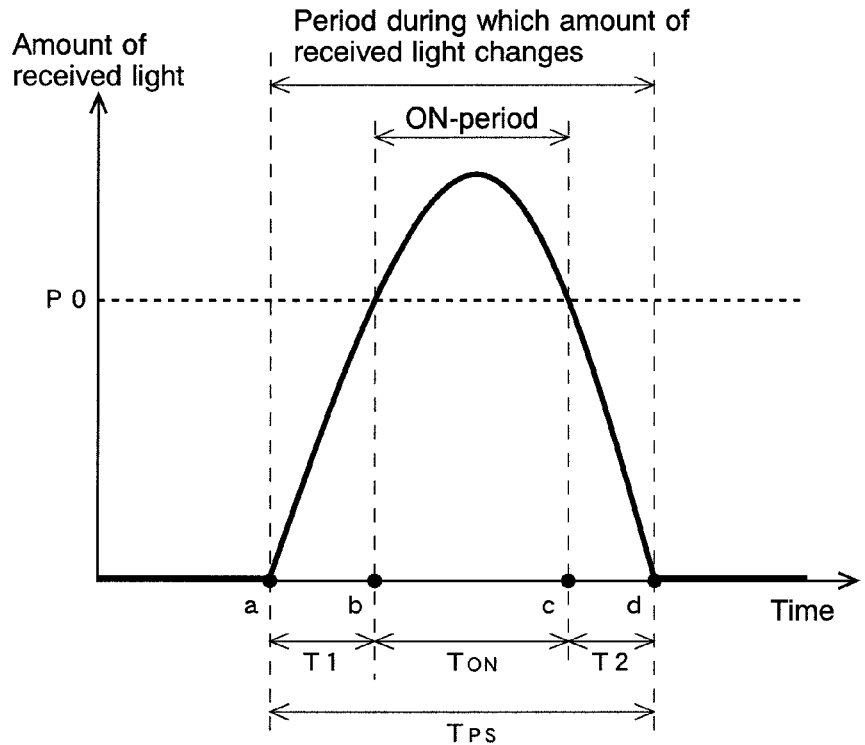
FIG. 5 is a schematic graph representing data on an amount of received light, for explaining the relationship between the period during which an amount of received light changes and the ON-period.

FIG. 5 shows a period corresponding to an object to be measured, using a graph schematically representing changes in data on an amount of received light, which occur in the photoelectric sensor 1 according to the movements of the work W.

In the graph, P0, on the vertical axis representing an amount of received light, is a threshold. A point a on the horizontal axis indicates a time when the amount of received light starts approaching the threshold P0 from a base level. A point d indicates a time when changes in the amount of received light converge and consequently return to the base level or almost reach the base level. In addition, each point b or c on the time axis indicates a time when an amount of received light corresponding to the threshold P0 is obtained.

According to the foregoing description, the period from the point a to the point d corresponds to the period during which an amount of received light changes, and the period from the point b to the point c corresponds to the ON-period. These periods are displayed on the display unit 101 as $T_{PS}$ and $T_{on}$.

$T_{PS}$ indicating length of the period during which an amount of received light changes substantially corresponds to a time taken for a work W to pass through the detecting area of the sensor 1. Hereinafter, this length $T_{PS}$ is referred to as "work passage period length $T_{PS}$." Also, hereinafter, the length $T_{ON}$ of the ON-period is referred to as "ON-period length $T_{ON}$."

The control unit 100 of the present example captures the data on the amount of received light at fixed intervals and measures the values to determine the points a, b, c, and d, and hence measures the lengths of periods T1 and $T_{on}$, and T2 between these points. Furthermore, the sum of T1, $T_{ON}$, and T2 is calculated to derive the work passage period length $T_{PS}$. The values $T_{ON}$ and $T_{PS}$ are displayed side by side on the displays 12A and 12B of the display unit 101.

FIG. 6 shows an example of a display showing the ON-period length $T_{ON}$ and the work passage period length $T_{PS}$. In the present example, the left and right digital displays 12A and 12b of the display unit 101 show the ON-period length $T_{ON}$ and the work passage period length $T_{PS}$, respectively.

Figure 6A:
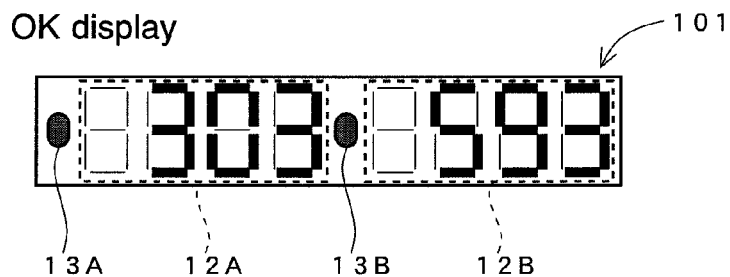
FIG. 6 shows an example of a display showing the ON-period length and work passage period length.
Figure 6B:
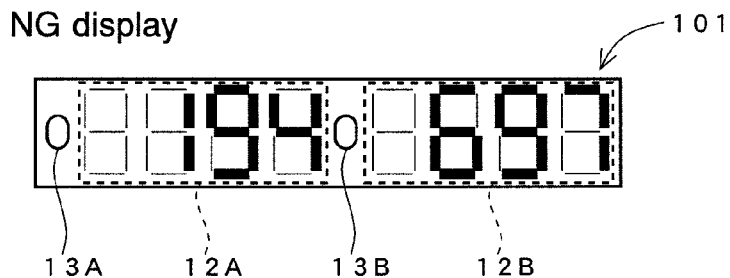

Additionally, in the present example, the time ratio Q ($Q=T_{PS}/T_{ON}$) falls within a range indicated by predetermined reference values Qa and Qb (Qa<Qb) is used as a condition in which the relationship between them is favorable. When values shown on the corresponding displays 12A and 12B satisfy the condition, the display lamps 13A and 13B are turned on, as shown in FIG. 6A. When the ratio Q does not satisfy the condition, the display lamps 13A and 13B are turned off, as shown in FIG. 6B.

The ON-period length $T_{ON}$ shown on the display 12A serves as an index enabling a user to determine whether a change in the amounts of received light resulting from the movement of the work W has been detected sufficiently. Further, by comparing the ON-period length $T_{ON}$ with the work passage period length $T_{PS}$ shown on the display 12B, a user can determine whether it is possible to adjust the threshold P0 so as to lengthen the ON-period length $T_{ON}$ than the current value (i.e., an adjustment decreasing the threshold P0), or whether it is possible to adjust the threshold P0 so as to make the ON-period length $T_{ON}$ shorter than the current value (i.e., an adjustment increasing the threshold P0).

For example, a user can make adjustments in a manner as described below. When the display lamps 13A and 13B are turned off, the user determines that the set threshold is inappropriate, and compares the $T_{ON}$ and $T_{PS}$ shown on the displays 12A and 12B, respectively. If the determination is made that $T_{ON}$ is too long with respect to the $T_{PS}$, the user increases the threshold P0. If the determination is made that it is too short, the user decreases the threshold P0. Also, when the display lamps 13A and 13B are turned on, the user can make a determination in the manner described above to adjust the threshold P0 to within the range that keeps the display lamps on.

In a conventional method for displaying the length of an ON-period and that of an OFF-period, even when the ON-period is sufficiently long, it does not mean that the period always corresponds to the range that is not affected by noise. Also, it is difficult to determine how much a range to be considered as an ON-period is included in the OFF-period.

Compared to this, the above-described display method according to the present invention enables a user not only to check the length $T_{ON}$ of the ON-period, but also to determine detection reliability in the ON-period from the relationship between the ON-period length $T_{ON}$ and the work passage period length $T_{PS}$, thereby adjusting the threshold P0. For example, if a margin for the work passage period length $T_{PS}$ with respect to the ON-period length $T_{ON}$ is too small even when the ON-period length $T_{On}$ itself seems appropriate, a determination is made that detection reliability is low and hence an adjustment increasing the threshold P0 is required. In addition, if the ON-period length $T_{ON}$ is insufficiently long, an adjustment decreasing the threshold P0 can be made to within a range that ensures sufficient margin for $T_{PS}$.

Accordingly, the threshold can easily be adjusted to an appropriate value.

Figure 7:
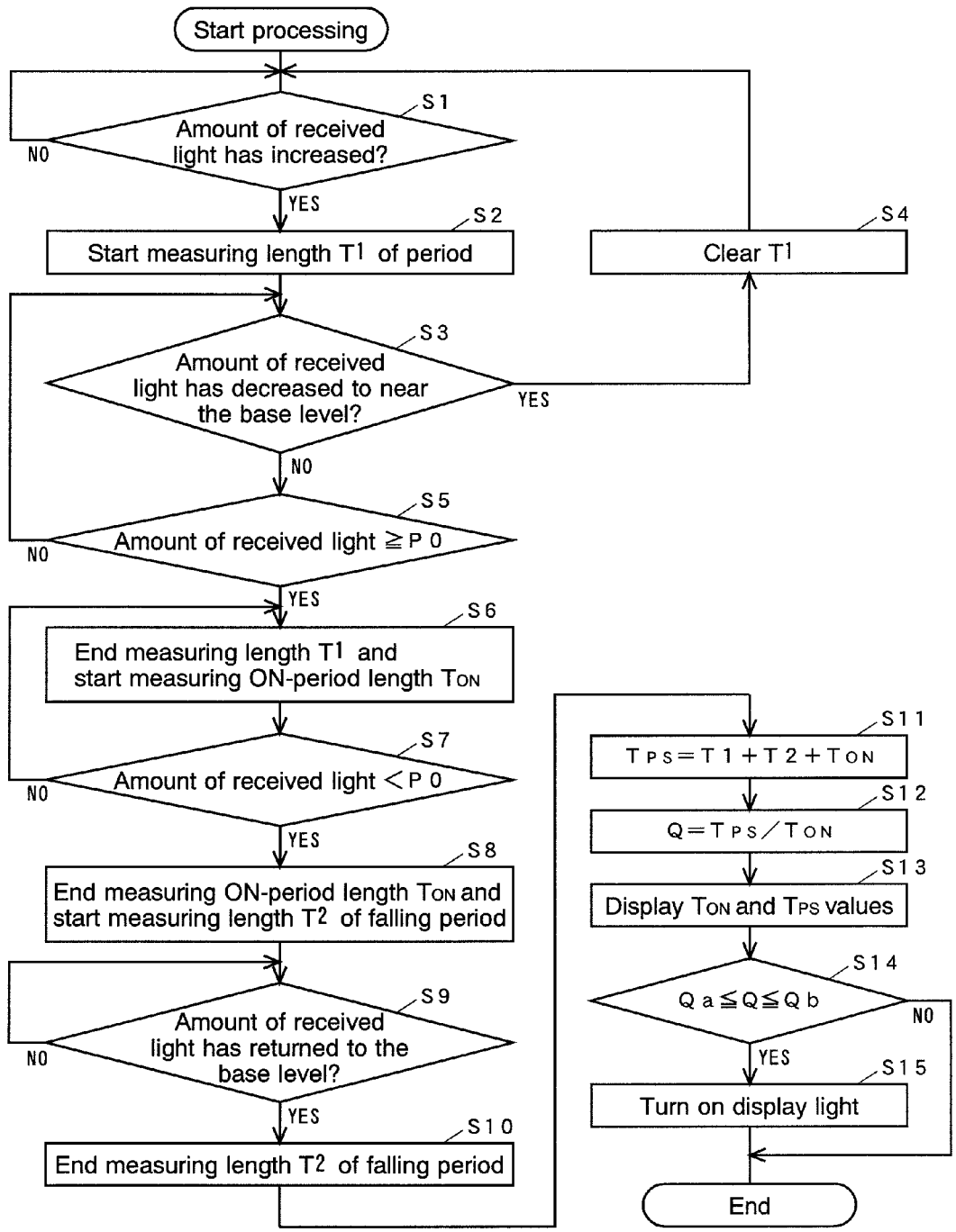
FIG. 7 is a flowchart illustrating a procedure for processing for the display shown in FIG. 6.

FIG. 7 illustrates a procedure for processing performed by the control unit 100 to achieve the display as described above. A description will be given with reference to the flowchart.

This processing is started when a setting mode for a threshold is started and when the threshold is altered in this setting mode.

In this processing, data on the amount of received light that is supplied from the light-receiving unit 104 are sampled at fixed intervals, the values are then measured, and each of these measurement values (i.e., the amounts of received light) is compared with the immediately previous amount of received light. Thereby, the processing waits until the amount of received light changes in the direction of increase (step S1).

Whether the amount of received light has changed is determined by comparing the change in the amount of received light from the previous amount of received light, with a determination reference value set on the basis of the assumed noise level. However, the determination is not limited thereto. The amount of received light may be compared with a reference value corresponding to a noise level, and when the amount of received light exceeds the reference value, it may be determined that the amount of received light has increased.

If it is determined as a result of the foregoing processing that the amount of received light has increased ("YES" in step S1), the control unit 100 starts measuring length T1 of the rising period (period from point a to point b in FIG. 5) (step S2). The time measurement is carried out until the amount of received light reaches a threshold P0 (until step S5 yields "YES").

If the amount of received light rises once but decreases to near the base level without reaching the threshold P0 ("YES" in step S3), length T1 of the rising period is cleared (step S4), and the processing returns to the step of checking any increase in the amount of received light (step S1).

When the amount of received light has smoothly increased to the threshold P0 ("YES" in step S5), the measurement of length T1 of the rising period ends, and the measurement of the ON-period length $T_{ON}$ starts (step S6). If the amount of received light decreases below the threshold P0 ("YES" in step S7), the measurement of the ON-period length $T_{ON}$ ends, and the measurement of length T2 of the falling period (the period from the point c to the point d in FIG. 5) starts (step S8).

If the amount of received light returns to the base level thereafter ("YES" in step S9), the measurement of length T2 of the falling period ends (step S10). Then, the sum of the length T1 of the rising period, the ON-period length $T_{ON}$, and length T2 of the falling period obtained up to this step is calculated, and this sum is set as the work passage period length $T_{PS}$ (step S11). Further, in the subsequent step S12, the ratio Q of the work passage period length $T_{PS}$ to the ON-period length $T_{ON}$ ($Q=T_{PS}/T_{ON}$) is calculated.

Thereafter, the control unit 100 shows the ON-period length $T_{ON}$ and the work passage period length $T_{PS}$ on the displays 12A and 12B of the display unit 101 (step S13). Furthermore, the control unit 100 checks whether the ratio Q satisfies the condition Qa≤Q≤Qc. If this condition is satisfied, the control unit 100 turns on display lights 13A and 13B (steps S14 and 15).

The contents of the displays 12A and 12B and the ON-states of the display lamps 13A and 13B are maintained until a user performs a clearing operation. The display contents of the display units 101 are obtained as a result of changes in the amounts of received light resulting from any movement of a work W first passing through the detection area immediately after the setting mode has started or the threshold P0 is adjusted.

However, the invention is not limited to this. The process from steps S1 to S11 in FIG. 7 may be performed a plurality of cycles in order to obtain the ON-period length $T_{ON}$ and the work passage period length $T_{PS}$ taken for each set of works, and display their average value. In this case, the ratio Q can be calculated using the average values of the ON-period lengths $T_{ON}$ and the work passage period lengths $T_{PS}$.

In addition, the values of $T_{ON}$ and $T_{PS}$ do not have to be displayed side by side. For example, if the display unit 101 has only a single display, $T_{ON}$ and $T_{PS}$ may be alternately displayed in accordance with a user's switching operation. Further, they do not have to be displayed digitally. For example, the display unit 101 may be formed from an array of tiny LEDs so that both $T_{ON}$ and $T_{PS}$ can be displayed in the form of a bar graph.

Furthermore, if the setting device is connected to the interface 106 for external devices, as shown in FIG. 4, and a value set for the threshold P0 is input from this device, the measurement values of the ON-period length $T_{ON}$ and the work passage period length $T_{PS}$ are transferred to the setting device, and these measurement values, the ratio Q, and the like may be displayed on the display unit of the device.

Additionally, in the foregoing example, the work passage period length $T_{PS}$ is displayed together with the ON-period length $T_{ON}$, thereby displaying the margin for the work passage period length $T_{PS}$ with respect to the ON-period length $T_{ON}$. However, instead of $T_{PS}$, a value for indicating the margin in detail may be displayed (For example, the previous ratio Q or the difference between $T_{PS}$ and $T_{ON}$).

Additionally, in the photoelectric sensor configured as described above, instead of comparing the measurement value of an amount of received light with a threshold, there may be a case where a calculation (for example, differentiation) is performed by further processing the measurement value of each amount of received light and the calculated result is compared with the threshold, thereby determining whether an object to be detected is present. In this case also, the ON-period length $T_{ON}$ and the work passage period length $T_{PS}$ may be calculated using data to be compared with the threshold, thereby displaying them on the display unit 101.

A description will be given of a photoelectric sensor 1 according to a second example of the present invention, which has two measurement modes differing in processing speed and selects and sets one of them. The appearance and circuit configuration of the photoelectric sensor 1 are identical to those shown in FIGS. 2 to 4, and the same signs used in FIGS. 2 to 4 are also used here for each configuration.

One of the two measurement modes is for high speed measurement of the amount of received light, and is set so that data on the amount of received light is sampled, for example, at intervals of 50μ seconds. Hereinafter, this measurement mode is referred to as a "high speed mode."

The other measurement mode decreases the speed at which data on the amount of received light are sampled but enables processes other than the basic detecting operation. For example, this mode includes processing selected by a user from among the processes such as: measuring the ON-period length $T_{ON}$ and the work passage period length $T_{PS}$ in the same manner as the setting process and displaying them; calculating the average value of amounts of received light during the ON-period; and communicating with external device and outputting measurement data. (Hereinafter, these processes are referred to as "optional processes.")

Some of conventional photoelectric sensors have measurement modes differing in processing speed or have the function of optional processes. However, measurement mode selection depends on user's determination, with the result that the measurement mode selected may not always be appropriate. In this respect, the present example adjusts a threshold P0 to an appropriate value on the basis of the margin for the work passage period length $T_{PS}$ with respect to the ON-period length $T_{ON}$, and then selects the measurement mode on the basis of the ON-period length $T_{ON}$ after the adjustment.

Figure 8:
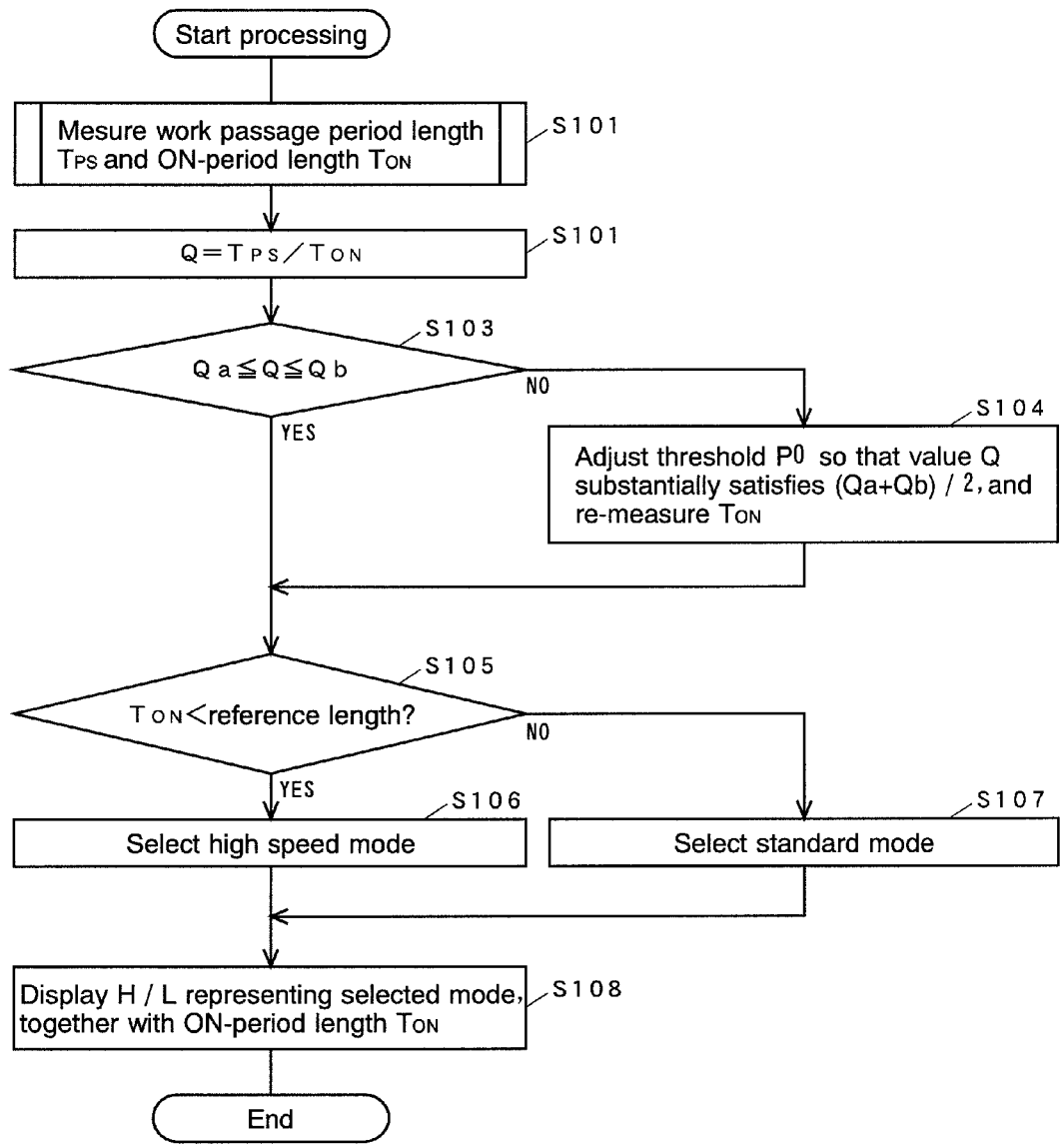
FIG. 8 is a flowchart illustrating a procedure for measurement mode selection.

FIG. 8 illustrates a procedure for measurement mode selection.

In the first step S101 in FIG. 8, the ON-period length $T_{ON}$ and the work passage period length $T_{PS}$ are measured by the same process as in steps S1 to S11 in FIG. 7. Furthermore, in S102, the ratio Q of the length $T_{ON}$ to the length $T_{PS}$ ($Q=T_{PS}/T_{ON}$) is calculated, and whether or not the value Q satisfies the condition Qa≤Q≤Qc is checked (step S103).

If the ratio Q satisfies the foregoing condition ("YES" in step S103), the ON-period length $T_{ON}$ is compared with a predetermined reference length (step S105). If the ON-period length $T_{ON}$ is shorter than the reference length ("YES" in step S105), the high speed mode is selected (step S106). If the ON-period length $T_{ON}$ is equal to or longer than the reference length ("NO" in step S105), the standard mode is selected (step S107).

On the other hand, if the ratio Q calculated in step S102 is smaller than the lower limit value Qa of the appropriate range of the ratio or if the ratio Q is higher than the upper limit value Qb of the appropriate range ("NO" in step S105), the control unit adjusts the threshold P0 so that the value Q substantially satisfies (Qa+Qb)/2. Based on the adjusted P0, the control unit measures the ON-period length $T_{ON}$ again (step S104). Subsequently, the control unit compares $T_{ON}$ after the remeasurement with the reference length (step S105) and, based on the result, selects the high speed mode or standard mode (step S106 or 107).

Incidentally, in the present example, the reference length to be compared with $T_{ON}$ in step S105 is set to a value obtained by multiplying a predetermined smallest number (n) of times that measurement is carried out in order to reliably detect a work W, and sampling intervals Δt in the standard mode. Thus, the shortest ON-period length required for steady detection in the standard mode is set as the reference length.

In the case of re-measuring the ON-period length $T_{ON}$ (step S104), the data on the amount of received light in step S101 may be processed again. However, the present invention is not limited thereto. Instead, fresh data on an amount of received light may be captured to measure the ON-period length $T_{ON}$.

When, the high speed mode or standard mode is selected as a result of the process from steps S105 to S107, a sign representing the selected mode is shown on the display unit 101 together with the ON-period length $T_{ON}$ in step S108, and the processing ends.

FIG. 9 shows an example of display contents obtained as a result of step S108. In the present example as in the first example, the display 12A is used for displaying the ON-period length and, if the margin Q satisfies the condition Qa≤Q≤Qb, the display lamps 13A and 13 are turned on.

Figure 9A:
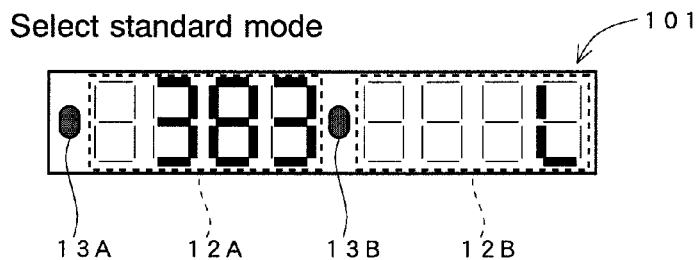
FIG. 9 shows an example of display contents obtained as a result of the measurement mode selection together with ON-period length.
Figure 9B:
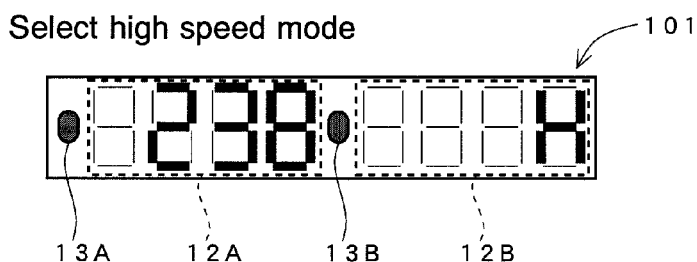

The display 12B is used for displaying a selected measurement mode. In this example, if the standard mode is selected, the display 12B shows a letter "L" as shown in FIG. 9A, and if a high speed mode is selected, a letter "H" is displayed as shown in FIG. 9B.

As described above, in the second example, an appropriate threshold P0 is automatically set. The measurement mode is also automatically set in accordance with the value of the ON-period length $T_{ON}$ corresponding to this setting.

In steps S105 to 107 in FIG. 8, the high speed mode is selected only when the standard mode cannot guarantee reliable detection, and the standard mode is selected in other situations. Accordingly, a measurement mode suitable for a change in an amount of received light which results from any movement of the work W is selected, and the detection operation can reliably be performed. Additionally, in conventional cases where high speed mode is used but adopting an optional process is hindered due to high speed movement of a work W, the present invention enables the selection of the standard mode and hence the adoption of an optional process, thereby improving usability.

In the foregoing example, the threshold P0 is automatically adjusted on the basis of the ratio Q of the work passage period length $T_{PS}$ to the ON-period length $T_{ON}$, but the present invention is not limited thereto. The following method may be adopted, in which the respective lengths $T_{ON}$ and $T_{PS}$ are displayed and the threshold P0 is manually adjusted as in the first example, and then one of the measurement modes is selected on the basis of the ON-period length $T_{ON}$ after the adjustment.

In addition, the photoelectric sensor 1 according to the first and second examples can be used to stop a work W at a specific point. In this case, after a threshold P0 is set, length T1 of the rising period based on the threshold P0 is measured, and the measured length T1 may be shown on the display 13A or 13B of the display unit 101. This length T1 of the rising period indicates a time lag between the time when a work W has reached the detecting area of the photoelectric sensor 1 and the time when the work W is detected. This displayed value enables a user to specify the distance by which the work W advances until it is detected. This facilitates control for stopping the work W at a target position.

If the photoelectric sensor 1 is used in order to stop a work W at a predetermined position, the measurement value of length T1 of the rising period is transmitted to an external computer. Using, for instance, the value T1, the moving speed of the work W, and the distance between the location of the photoelectric sensor 1 and the stopped position of the work W, the computer may calculate length of the time required to stop the work W after the output of the photoelectric sensor 1 is on.

In accordance with one aspect of the present invention, a photoelectric sensor is applied includes: a light-projecting unit for projecting light; a light-receiving unit for receiving light projected from the light-projecting unit and generating data on an amount of received light; an output unit for outputting a detection signal indicating that a detection target has been detected; a signal processing unit for receiving the data on the amount of received light generated by the light-receiving unit, performing a measuring process for the data on the amount of received light, comparing measurement data obtained by the measurement process with a predetermined threshold to determine whether a detection target is present or not, and switching between ON and OFF states of the detection signal according to a result of the determination; and an input unit for inputting a set value for the threshold.

In the foregoing configuration, the light-receiving unit may directly receive light emitted by a light-projecting element (transmission type) or may receive light that is emitted by a light-projecting element and then reflected by an object (reflection type). The signal processing unit performs the measuring process, for example, by measuring every time or every fixed time a datum on an amount of received light, input by the light-receiving unit. Further, the signal processing unit may calculate: the change in an amount of received light per unit time by differentiating data on an amount of received light obtained by the measurement, or the moving average on the data of the amount of received light.

To enable a user to easily check whether a threshold that is appropriate for reliable detection has be set, in the photoelectric sensor, the signal processing unit includes: first time-measuring means for measuring a length of a measurement data change period which is from when measurement data at a level at which the detection signal is off starts to change in a direction of the threshold to when the measurement data returns to a level at which the measurement data started to change; second time-measuring means for measuring a length of an ON-period for which measurement data at a level at which the detection signal is on is obtained during the measurement data change period; and output means for outputting, on the basis of measurement results obtained from the first time-measuring means and the second time-measuring means, information on the length of the ON-period and on a margin for the measurement data change period with respect to the ON-period in order to display the information.

If the photoelectric sensor is provided with a display unit, the output unit can supply information on the margin to the display unit. In addition, if the photoelectric sensor is set so as to communicate with an external device with a display function, the output means may be configured as means for transmitting information on the margin to this external device.

The "margin for the measurement data change period with respect to the ON-period" described above shall mean how long the ON-period can be extended in the measurement data change period. Information indicating the margin may be the length of the measurement data change period as is. However, the ratio of the two periods or the difference between the lengths of the periods may be displayed. In addition, the value of the ratio or difference may be converted into one level out of a plurality of levels and the level may be displayed.

In the foregoing display, by virtue of the displayed information, the user can check the length of the ON-period corresponding to the current threshold and the margin for the measurement data change period with respect to the ON-period.

Accordingly, if a user determines that the displayed length of the ON-period is insufficient for reliable detection, he or she can set the value for the threshold toward the base level on the basis of the displayed margin so that the value is not set too close to the base level. In addition, if the user determines that the margin indicated in the display is too small, the user may set the value for the threshold toward the peak level so that the margin is not too large. Thus, a user can easily set an appropriate threshold based on the two types of information.

In the photoelectric sensor according to an embodiment of the present invention, the signal processing unit further includes determination means for determining whether the margin is appropriate on the basis of a relationship between the length of the measurement data change period and the length of the ON-period. In addition, the output means outputs a determination result obtained by the determination means, together with the information on the margin.

The foregoing embodiment enables a user to determine easily, from the determination displayed result, whether the margin for the measurement data change period with respect to the ON-period is within an appropriate range.

In the photoelectric sensor according to another embodiment of the present invention, the signal processing unit further includes: determination means for determining whether the margin is appropriate on the basis of the relationship between the length of the measurement data change period and the length of the ON-period; and threshold adjustment means for adjusting, if the determination means determines that the margin is inappropriate, the threshold so that the relationship between the length of the measurement data change period and the length of the ON-period satisfies a predetermined reference relationship.

In the foregoing configuration, when the margin for the measurement data change period with respect to the ON-period is excessively high or low, the threshold is automatically set so that the margin is appropriate. Accordingly, the burden on a user setting the threshold greatly decreases.

In the photoelectric sensor according to another embodiment of the present invention, a plurality of measurement modes of different processing speeds are set for the signal processing unit, and the signal processing unit further includes mode selection means for selecting a measurement mode for carrying out measurement at least a predetermined number of times during the ON-period, from among the plurality of measurement modes, provided that the determination means has determined that the threshold is appropriate.

In the foregoing configuration, provided that a threshold that is appropriate for reliable detection has been set, the measurement mode is set automatically, in which measurement can be carried out at least the predetermined number of times within the length of time period during which a detection target is detected on the basis of the threshold. This ensures the number of measurement data required for reliably setting the detection signal on, thus enabling reliable detection.

In the photoelectric sensor according to another embodiment of the present invention, the signal processing unit further includes: third time-measuring means for measuring a length of time period from when the measurement data change period starts to when the measurement data reaches the threshold within the measurement data change period; and measured-time output means for outputting data on the length of time period measured by the third time-measuring means. The measured-time output means may be configured as means for outputting data to be displayed. However, the present invention is not limited this mode. For example, data on the length of measured time period may be transmitted to an external device as calculation data.

In order that an object moving at a constant speed is stopped at a predetermined position, the photoelectric sensor according to the foregoing embodiment may be used to detect the object at a point immediately prior to the stopping position. In this case, the time period measured by the third time-measuring means and output by the measured-time output means can be recognized as a time period taken from when a detection target reaches a detection area of the sensor to when the detection signal is turned on. Accordingly, taking this time period and the moving speed of the detection target into account, a user can determine the time to stop movement of the detection target. This enables accurate controls of the position of an object.

Further, an embodiment of the present invention is applied to a method for aiding checking whether or not a threshold set for a photoelectric sensor is appropriate. The photoelectric sensor includes: a light-projecting unit for projecting light; a light-receiving unit for receiving light projected from the light-projecting unit and generating data on an amount of received light; an output unit for outputting a detection signal indicating that a detection target has been detected; a signal processing unit for receiving the data on the amount of received light generated by the light-receiving portion, performing a measuring process for the data on the amount of received light, comparing measurement data obtained by the measurement process with a predetermined threshold to determine whether a detection target is present or not, and switching between ON and OFF states of the detection signal according to a result of the determination; and an input unit for inputting a set value for the threshold.

The method includes: causing the photoelectric sensor to measure a length of a measurement data change period which is from when measurement data at a level at which the detection signal is off starts to change in a direction of the threshold to when the measurement data returns to a level at which the measurement data started to change; and causing the photoelectric sensor to measure a length of an ON-period for which measurement data at a level at which the detection signal is on is obtained during the measurement data change period. In addition, on the basis of a relationship between the lengths of the measurement data change period and the ON-period, information on the length of the ON-period and on a margin for the measurement data change period with respect to the ON-period is displayed on a display unit provided integrally with the photoelectric sensor or on an external display provided for the photoelectric sensor.

By virtue of the information displayed, the foregoing method facilitates: user's determination whether the length of the ON-period is appropriate, whether adjustment of a threshold so as to lengthen or shorten the ON-period is required, and whether the threshold adjustments are possible. Accordingly, the burden of setting a threshold is greatly decreased.

According to the embodiments described above, information on the margin for the measurement data change period with respect to the ON-period is displayed together with information on the length of the ON-period based on the threshold set. Accordingly, based on the information, the embodiments can facilitate user's determination whether the length of the ON-period is appropriate, whether adjustment of a threshold so as to lengthen or shorten the ON-period is required, and whether the threshold adjustments are possible.

Accordingly, a threshold appropriate for reliably detecting a detection target can be set easily, reducing a user's burden in setting the threshold.

What is claimed is:

1. A photoelectric sensor comprising:
   a light-projecting unit for projecting light;
   a light-receiving unit for receiving light projected from the light-projecting unit and generating data on an amount of received light;
   an output unit for outputting a detection signal indicating that a detection target has been detected;
   a signal processing unit for receiving the data on the amount of received light generated by the light-receiving unit, performing a measuring process for the data on the amount of received light, comparing measurement data obtained by the measurement process with a predetermined threshold to determine whether a detection target is present or not, and switching between ON and OFF states of the detection signal according to a result of the determination; and
   an input unit for inputting a set value for the threshold, wherein
   the signal processing unit includes:
      first time-measuring means for measuring a length of a measurement data change period which is from when measurement data at a level at which the detection signal is off starts to change in a direction of the threshold to when the measurement data returns to a level at which the measurement data started to change;
      second time-measuring means for measuring a length of an ON-period for which measurement data at a level at which the detection signal is on is obtained during the measurement data change period; and
      output means for outputting, on the basis of measurement results obtained from the first time-measuring means and the second time-measuring means, information on the length of the ON-period and on a margin for the measurement data change period with respect to the ON-period in order to display the information.

2. The photoelectric sensor according to claim 1, wherein the signal processing unit further includes determination means for determining whether the margin is appropriate on the basis of a relationship between the length of the measurement data change period and the length of the ON-period, and wherein
   the output means outputs a determination result obtained by the determination means, together with the information on the margin.

3. The photoelectric sensor according to claim 1, wherein the signal processing unit further includes:
   determination means for determining whether the margin is appropriate on the basis of the relationship between the length of the measurement data change period and the length of the ON-period; and
   threshold adjustment means for adjusting, if the determination means determines that the margin is inappropriate, the threshold so that the relationship between the length of the measurement data change period and the length of the ON-period satisfies a predetermined reference relationship.

4. The photoelectric sensor according to claim 2, wherein a plurality of measurement modes of different processing speeds are set for the signal processing unit, and wherein
   the signal processing unit further includes mode selection means for selecting a measurement mode for carrying out measurement at least a predetermined number of times during the ON-period, from among the plurality of measurement modes, provided that the determination means has determined that the threshold is appropriate.

5. The photoelectric sensor according to claim 1, wherein the signal processing unit further includes:
   third time-measuring means for measuring a length of time period from when the measurement data change period starts to when the measurement data reaches the threshold within the measurement data change period; and
   measured-time output means for outputting data on the length of time period measured by the third time-measuring means.

6. A method for aiding checking whether or not a threshold set for a photoelectric sensor is appropriate, the photoelectric sensor including: a light-projecting unit for projecting light; a light-receiving unit for receiving light projected from the light-projecting unit and generating data on an amount of received light; an output unit for outputting a detection signal indicating that a detection target has been detected; a signal processing unit for receiving the data on the amount of received light generated by the light-receiving portion, performing a measuring process for the data on the amount of received light, comparing measurement data obtained by the measurement process with a predetermined threshold to determine whether a detection target is present or not, and switching between ON and OFF states of the detection signal according to a result of the determination; and an input unit for inputting a set value for the threshold,
   the method comprising:
   causing the photoelectric sensor to measure a length of a measurement data change period which is from when measurement data at a level at which the detection signal is off starts to change in a direction of the threshold to when the measurement data returns to a level at which the measurement data started to change;
   causing the photoelectric sensor to measure a length of an ON-period for which measurement data at a level at which the detection signal is on is obtained during the measurement data change period;
   on the basis of a relationship between the lengths of the measurement data change period and the ON-period, displaying information on the length of the ON-period and on a margin for the measurement data change period with respect to the ON-period on a display unit provided integrally with the photoelectric sensor or on an external display provided for the photoelectric sensor.

\* \* \* \* \*